US011989129B2

(12) United States Patent
Delehanty et al.

(10) Patent No.: US 11,989,129 B2
(45) Date of Patent: May 21, 2024

(54) MULTIPLE VIRTUAL NUMA DOMAINS WITHIN A SINGLE NUMA DOMAIN VIA OPERATING SYSTEM INTERFACE TABLES

(71) Applicant: Intel Corporation, Santa Clara, CA (US)

(72) Inventors: Kyle Delehanty, Austin, TX (US); Sridharan Sakthivelu, DuPont, WA (US); Janardhana Yoga Narasimhaswamy, Portland, OR (US); Vijay Bahirji, Hillsboro, OR (US); Toby Opferman, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 777 days.

(21) Appl. No.: 16/986,490

(22) Filed: Aug. 6, 2020

(65) Prior Publication Data

US 2021/0019260 A1 Jan. 21, 2021

(51) Int. Cl.
*G06F 12/0846* (2016.01)
*G06F 9/455* (2018.01)
*G06F 9/50* (2006.01)
*G06F 12/0806* (2016.01)
*G06F 12/0871* (2016.01)

(52) U.S. Cl.
CPC ...... *G06F 12/0851* (2013.01); *G06F 9/45533* (2013.01); *G06F 9/5016* (2013.01); *G06F 12/0806* (2013.01); *G06F 12/0871* (2013.01); *G06F 2009/45583* (2013.01); *G06F 2212/2542* (2013.01)

(58) Field of Classification Search
CPC ............. G06F 9/45533; G06F 9/45558; G06F 9/5016; G06F 9/5061; G06F 12/0806; G06F 12/0813; G06F 12/0851; G06F 12/0871; G06F 2009/45562; G06F 2009/45579; G06F 2009/45583; G06F 2009/5012; G06F 2212/152; G06F 2212/2542

See application file for complete search history.

(56) References Cited

U.S. PATENT DOCUMENTS

| 10,146,681 | B2 | 12/2018 | Bernat et al. | |
|---|---|---|---|---|
| 2013/0346707 | A1* | 12/2013 | Voznika | G06F 12/126 711/E12.001 |
| 2014/0245295 | A1* | 8/2014 | Tsirkin | G06F 9/5077 718/1 |
| 2017/0371777 | A1* | 12/2017 | Kim | G06F 9/5016 |
| 2019/0391835 | A1* | 12/2019 | Gowda | G06F 9/45558 |

OTHER PUBLICATIONS

U.S. Appl. No. 16/790,203 entitled "Deployment of Bios to Operating System Data Exchange," filed Feb. 13, 2020, 31 pages.
U.S. Appl. No. 63/025,587 entitled "Interface and Warm Reset Path for Memory Device Firmware Upgrades," filed May 15, 2020, 37 pages.

* cited by examiner

*Primary Examiner* — Aracelis Ruiz
(74) *Attorney, Agent, or Firm* — Jordan IP Law, LLC (57) ABSTRACT

Systems, apparatuses and methods may provide for technology that identifies a NUMA node, defines a first virtual proximity domain within the NUMA node, and defines a second virtual proximity domain within the NUMA node, wherein the first virtual proximity domain and the second virtual proximity domain are defined via one or more OS interface tables.

22 Claims, 8 Drawing Sheets

MULTIPLE VIRTUAL NUMA DOMAINS WITHIN A SINGLE NUMA DOMAIN VIA OPERATING SYSTEM INTERFACE TABLES

TECHNICAL FIELD

Embodiments generally relate to non-uniform memory access (NUMA) architectures. More particularly, embodiments relate to the establishment of multiple virtual NUMA domains within a single NUMA domain via operating system (OS) interface tables.

BACKGROUND

In modern CPU (central processing unit) architectures, core counts are increasing significantly to a level where the OS and/or applications create virtual NUMA nodes for easy management and improved performance by dividing the contended software objects per NUMA domain. This virtual NUMA creation at the OS level may also be needed for backward compatibility. WINDOWS virtualizes two or more NUMA nodes with up to sixty-four logical threads each, using a concept called GROUP, to support a single multiprocessor NUMA node with more than sixty-four logical threads. Such an approach may cause imbalance in the memory available among GROUPS, and in the number of logical threads among GROUPS, which is disadvantageous for workloads involving high memory bandwidth per NUMA domain and high core counts.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
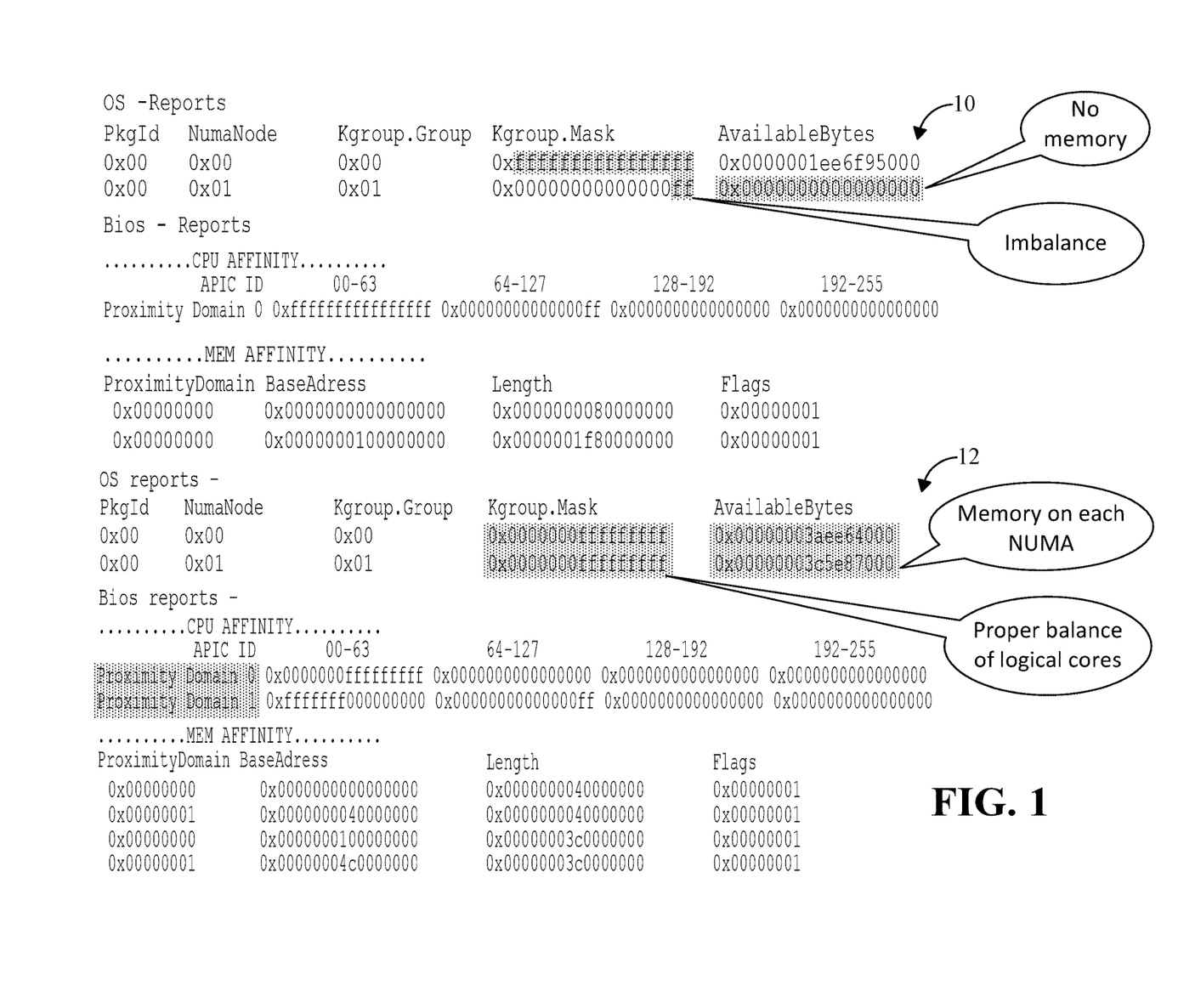
FIG. 1 is a comparative illustration of an example of conventional OS and BIOS (basic input/output system) reports and OS and BIOS reports according to an embodiment.

Turning now to FIG. 1, conventional BIOS and OS reports 10 are shown for a 36-core single socket system with hyperthreading enabled and SNC disabled. In the illustrated example, the BIOS ACPI (Advanced Configuration and Power Interface) will correctly describe seventy-two threads in a single memory proximity domain. Conventional operating systems such as WINDOWS, however, currently handle such a situation by creating two processor groups and two memory nodes. Threads 0-63 are in Group 0 with all available memory, and threads 64-71 are in Group 1 with no memory. The result is improper memory allocation and an imbalance in the number of logical cores per NUMA node. The problem is particularly significant for larger core counts.

As will be discussed in greater detail, a virtual NUMA mode in ACPI BIOS may create multiple virtual proximity domains in an OS interface table such as a system resource affinity table (SRAT) for one physical multiprocessor without changing memory controller/channel interleaving or LLC (last level cache) grouping. The OS interprets the OS interface tables to create multiple processor groups/multiple NUMAs. As shown in enhanced OS and BIOS reports 12, this virtual NUMA concept resolves the problem of improper memory allocation and imbalances in the number of logical cores per NUMA node. More particularly, embodiments may overcome the OS limitation of sixty-four logical threads per group, overcome the imbalanced number of logical threads per group, and provide significantly higher bandwidth/NUMA than hard partitioning.

Figure 2A:
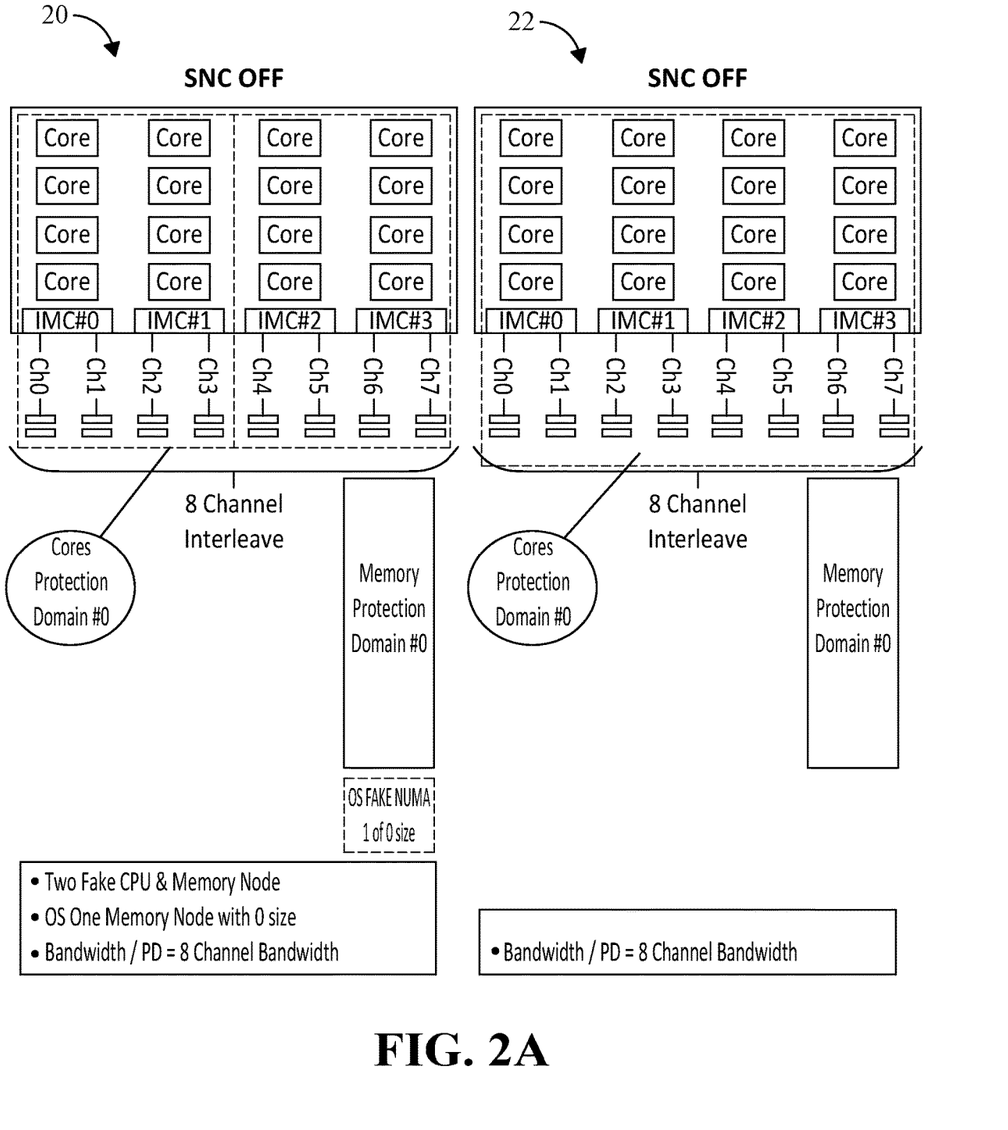
FIG. 2A is a comparative block diagram of an example of a conventional architecture with no sub-NUMA clustering (SNC) and an architecture with no SNC according to an embodiment.

Turning now to FIG. 2A, a conventional architecture 20 is shown in which SNC is disabled. In general, cores and memory of each CPU multiprocessor are divided into separate clusters, which the OS uses to create GROUP objects with fewer than sixty-four logical threads. In the illustrated example, the architecture 20 includes two "fake" CPU and memory nodes and the OS has one memory node with a size of zero.

By contrast, system firmware embodiments describe multiple "virtual NUMA" memory domains within a single NUMA node via ACPI tables. For example, system firmware may generate ACPI tables to associate subsets of logical processors in a NUMA node with a corresponding subset of the memory belonging to that physical NUMA node. Such an approach enables proper balancing and utilization of all logical processors within a single NUMA memory node, in the case where an operating system has limitations on the number of logical cores allowed per NUMA memory range. Thus, an enhanced architecture 22 does not include fake CPU and memory nodes or an OS with one memory node with a size of zero. Both of the illustrated architectures 20, 22 have a channel bandwidth of eight.

Figure 2B:
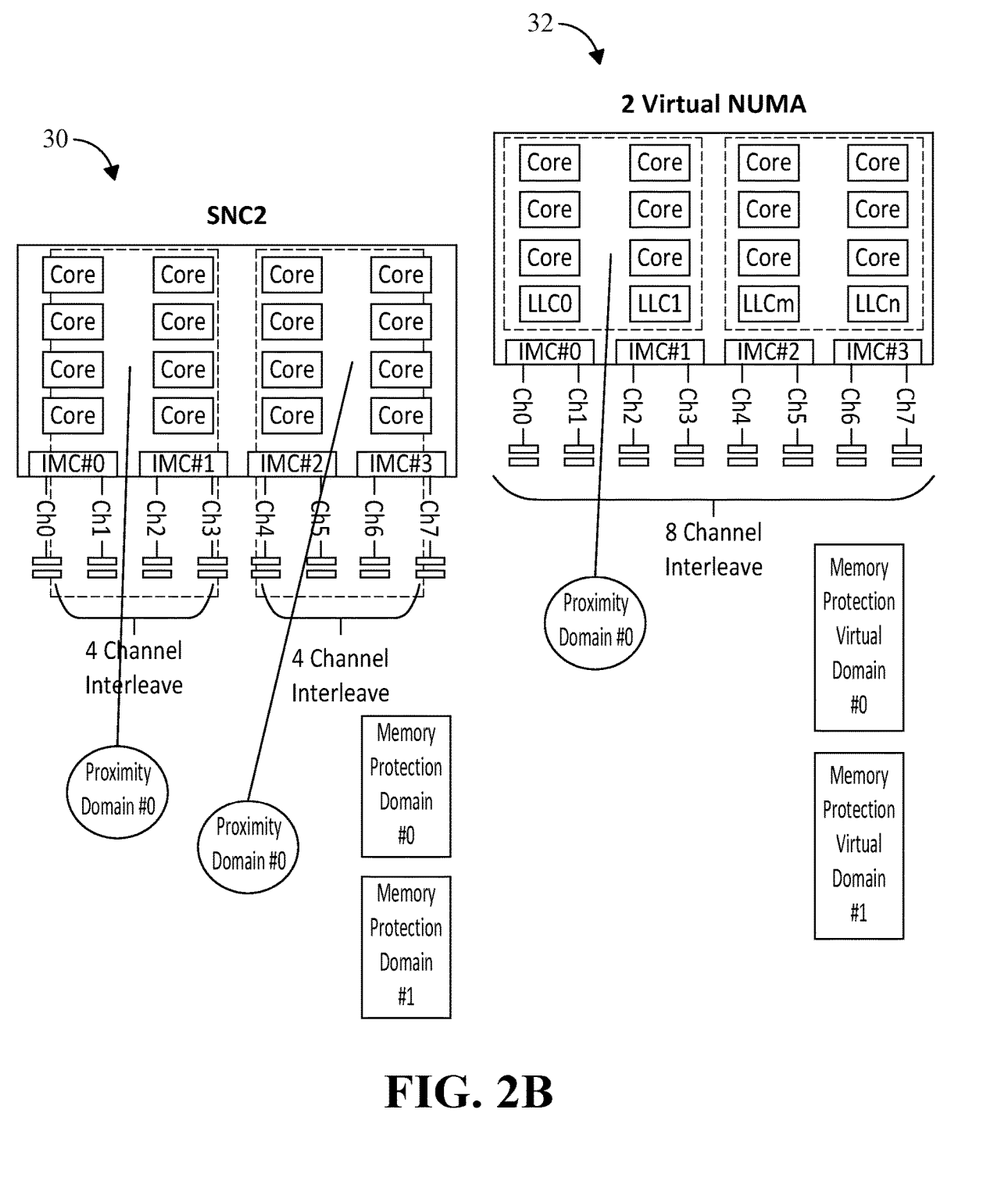
FIG. 2B is a comparative block diagram of an example an architecture with two sub-NUMA clusters and an architecture with two virtual proximity domains according to an embodiment.

FIG. 2B demonstrates that a conventional architecture 30 with two sub-NUMA clusters has a channel bandwidth of four, whereas an enhanced architecture 32 with two virtual proximity domains has a channel bandwidth of eight. Thus, the enhanced architecture 32 maintains the initial (e.g., pre-SNC enablement) interleave configuration and cache grouping.

Figure 2C:
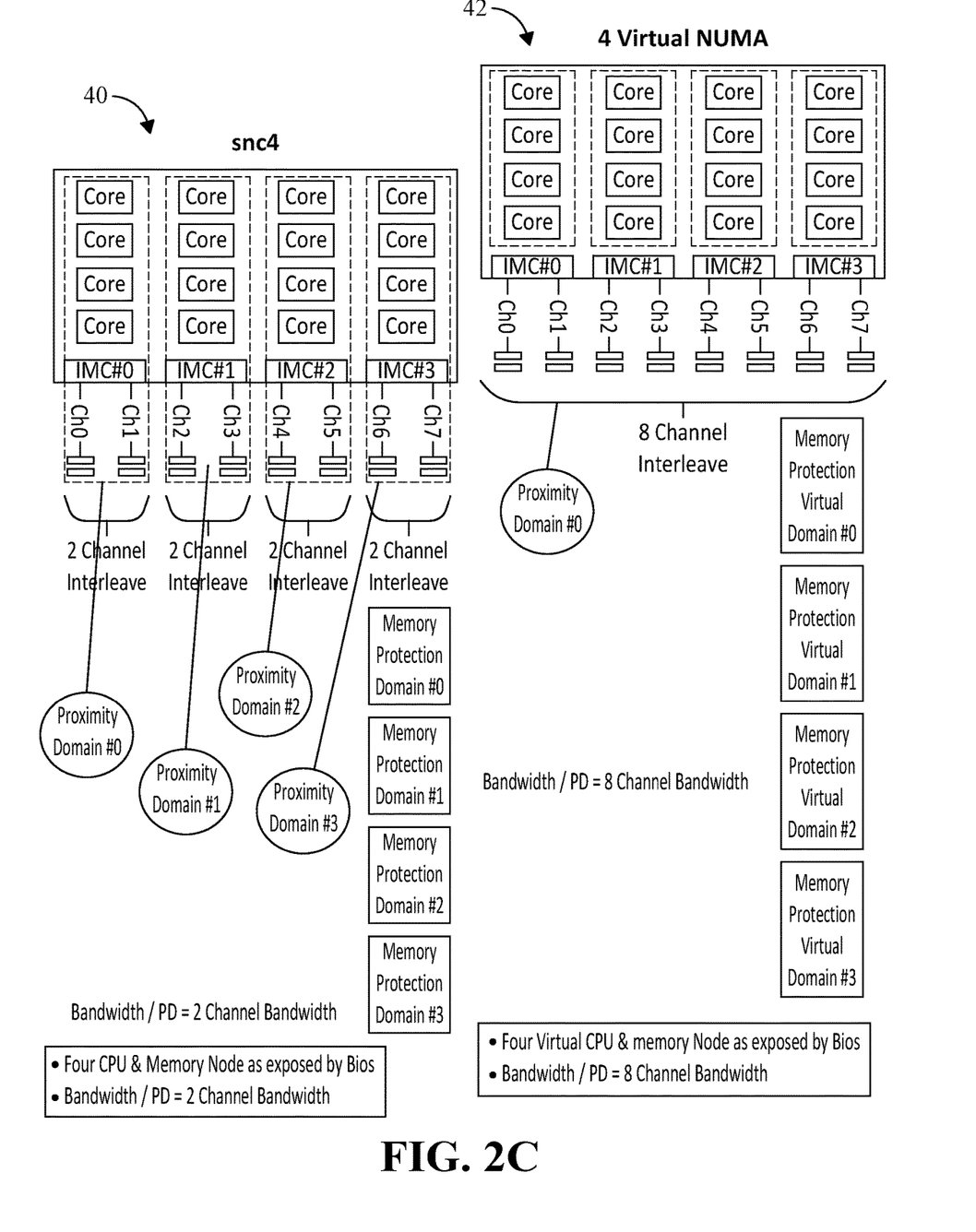
FIG. 2C is a comparative block diagram of an example of an architecture with four sub-NUMA clusters and an architecture with four virtual proximity domains according to an embodiment.

FIG. 2C demonstrates that a conventional architecture 40 with four sub-NUMA clusters has a channel bandwidth of two, whereas an enhanced architecture 42 with four virtual proximity domains has a channel bandwidth of eight. Thus, memory bandwidth is distributed across all interleaved memory channels within the physical NUMA node and the enhanced architecture 42 maintains the initial (e.g., pre-SNC enablement) interleave configuration and cache grouping.

Figure 3:
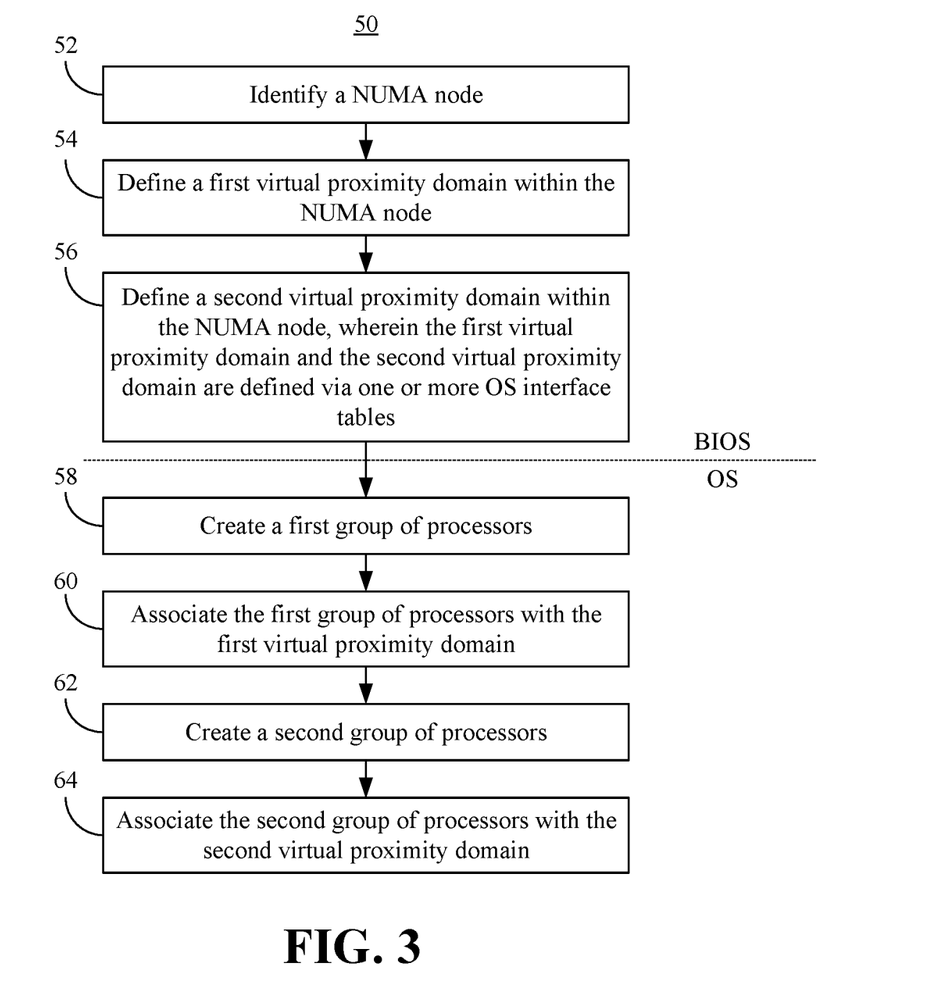
FIG. 3 is a flowchart of an example of a method of operating a performance-enhanced computing system according to an embodiment.

FIG. 3 shows a method 50 of operating a performance-enhanced computing system. The method 50 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 50 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated BIOS processing block 52 identifies a NUMA node, where a first virtual proximity domain is defined at BIOS block 54. In an embodiment, the NUMA node is dedicated to a single physical multiprocessor. BIOS block 56 defines a second virtual proximity domain within the NUMA node. In the illustrated example, the first virtual proximity domain and the second virtual proximity domain are defined via one or more OS interface tables such as, for example, a static resource affinity table (SRAT), a system locality information table (SLIT), etc., or any combination thereof. In one example, the physical multiprocessor has an initial interleave configuration (e.g., eight channel bandwidth) and defining the first virtual proximity domain and the second virtual proximity domain includes maintaining the initial interleave configuration. Additionally, the physical multiprocessor may have an initial cache grouping (e.g., LLC grouping). In such a case, defining the first virtual proximity domain and the second virtual proximity domain may include maintaining the initial cache grouping.

Although two virtual proximity domains are defined in the illustrated example to facilitate discussion, the number of virtual proximity domains is not limited to two. Thus, the method 50 may define more than two virtual proximity domains within the NUMA node via the one or more OS interface tables. Additionally, in cases where a CPU package is designed with more than one physical NUMA node per socket, each of those physical NUMA nodes may be represented as two or more virtual NUMA nodes. Accordingly, the method 50 may also identify a second NUMA node, wherein the second NUMA node is dedicated to the physical socket and define two or more virtual proximity domains within the second NUMA node (e.g., via the one of more OS interface tables).

In an embodiment, OS block 58 creates a first group of processors, where the first group of processors is associated with the first virtual proximity domain at OS block 60. OS block 60 may include mapping one or more logical threads corresponding to the first group of processors to the first virtual proximity domain. Additionally, OS block 62 creates a second group of processors and OS block 64 associates the second group of processors with the second virtual proximity domain. OS block 64 may include mapping one or more logical threads corresponding to the second group of processors to the second virtual proximity domain. The illustrated method 50 therefore enhances performance by overcoming OS limitations on the number of logical threads per group, overcoming imbalances in the number of logical threads per group, and providing significantly higher bandwidth per NUMA node than hard partitioning.

Figure 4:
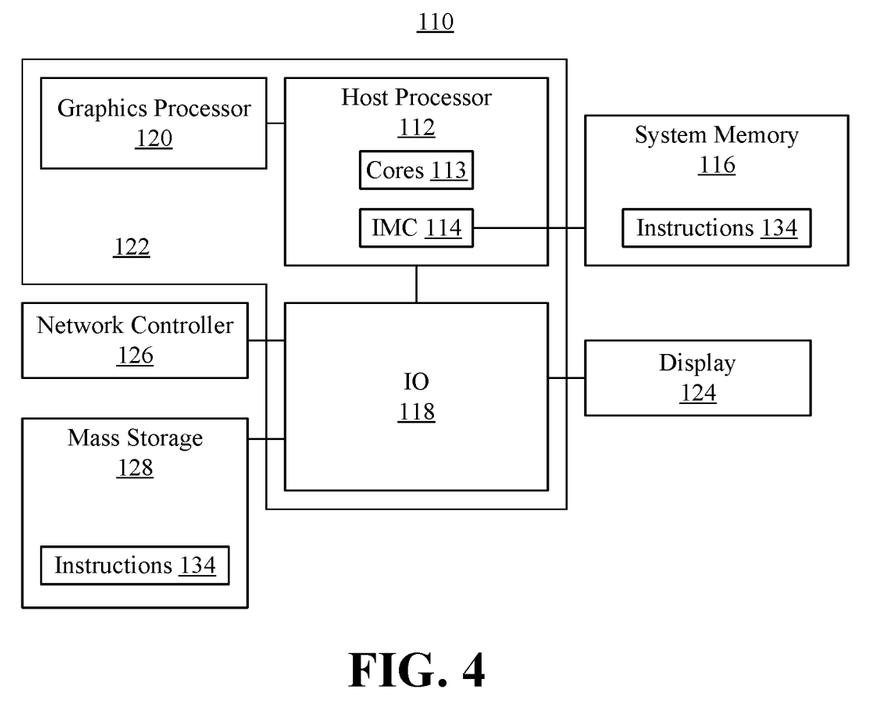
FIG. 4 is a block diagram of an example of a performance-enhanced computing system according to an embodiment.

Turning now to FIG. 4, a performance-enhanced computing system 110 is shown. The system 110 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof. In the illustrated example, the system 110 includes a host processor 112 (e.g., central processing unit/CPU) having a plurality of cores 113 and an integrated memory controller (IMC) 114 that is coupled to a system memory 116.

The illustrated system 110 also includes an input output (IO) module 118 implemented together with the host processor 112 and a graphics processor 120 (e.g., graphics processing unit/GPU) on a semiconductor die 122 as a system on chip (SoC). The illustrated IO module 118 communicates with, for example, a display 124 (e.g., touch screen, liquid crystal display/LCD, light emitting diode/LED display), a network controller 126 (e.g., wired and/or wireless), and mass storage 128 (e.g., hard disk drive/HDD, optical disk, solid state drive/SSD, flash memory).

In an embodiment, the host processor 112, the graphics processor 120 and/or the IO module 118 execute program instructions 134 retrieved from the system memory 116 and/or the mass storage 128 to perform one or more aspects of the method 50 (FIG. 3), already discussed. Thus, execution of the instructions 134 may cause the semiconductor die 122 and/or the computing system 110 to identify a NUMA node, define a first virtual proximity domain within the NUMA node, and define a second virtual proximity domain within the NUMA node, wherein the first virtual proximity domain and the second virtual proximity domain are defined via one or more OS interface tables. The system 110 is therefore performance-enhanced at least to the extent that the system 110 overcomes OS limitations on the number of logical threads per group, overcomes imbalances in the number of logical threads per group, and provides significantly higher bandwidth per NUMA node than hard partitioning.

Figure 5:
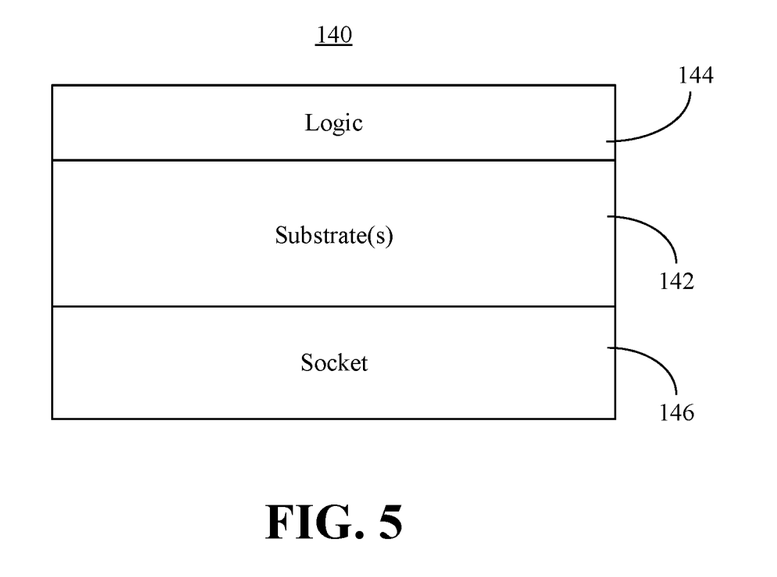
FIG. 5 is an illustration of an example of a semiconductor apparatus according to an embodiment.

FIG. 5 shows a semiconductor package apparatus 140. The illustrated apparatus 140 includes one or more substrates 142 (e.g., silicon, sapphire, gallium arsenide) and logic 144 (e.g., transistor array and other integrated circuit/IC components) coupled to the substrate(s) 142. The illustrated one or more substrates 142 are coupled (e.g., plugged into) a socket 146 (e.g., directly or via one or more intermediate components). The logic 144 may be implemented at least partly in configurable logic or fixed-functionality logic hardware. In one example, the logic 144 implements one or more aspects of the method 50 (FIG. 3), already discussed. Thus, the logic 144 may identify a NUMA node, define a first virtual proximity domain within the NUMA node, and define a second virtual proximity domain within the NUMA node, wherein the first virtual proximity domain and the second virtual proximity domain are defined via one or more OS interface tables. The apparatus 140 is therefore performance-enhanced at least to the extent that the apparatus 140 overcomes OS limitations on the number of logical threads per group, overcomes imbalances in the number of logical threads per group, and provides significantly higher bandwidth per NUMA node than hard partitioning.

In one example, the logic 144 includes transistor channel regions that are positioned (e.g., embedded) within the substrate(s) 142. Thus, the interface between the logic 144 and the substrate(s) 142 may not be an abrupt junction. The logic 144 may also be considered to include an epitaxial layer that is grown on an initial wafer of the substrate(s) 142.

Figure 6:
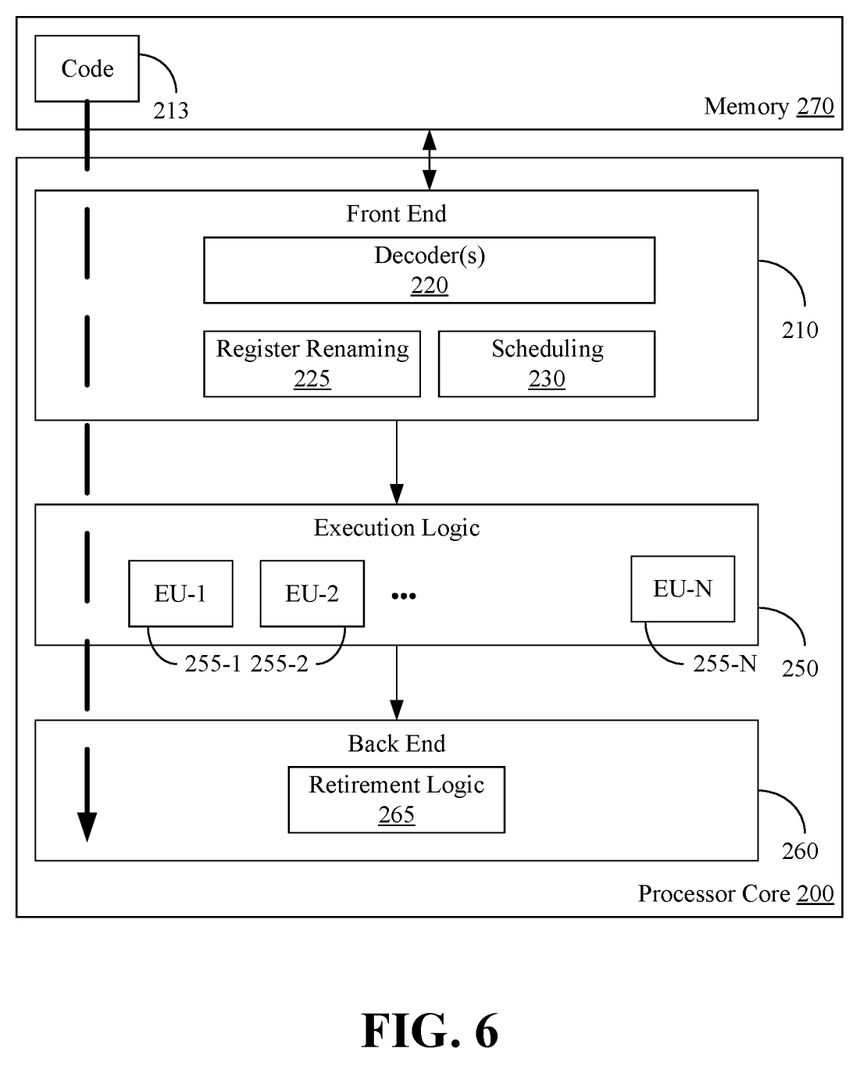
FIG. 6 is a block diagram of an example of a processor according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 50 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 7:
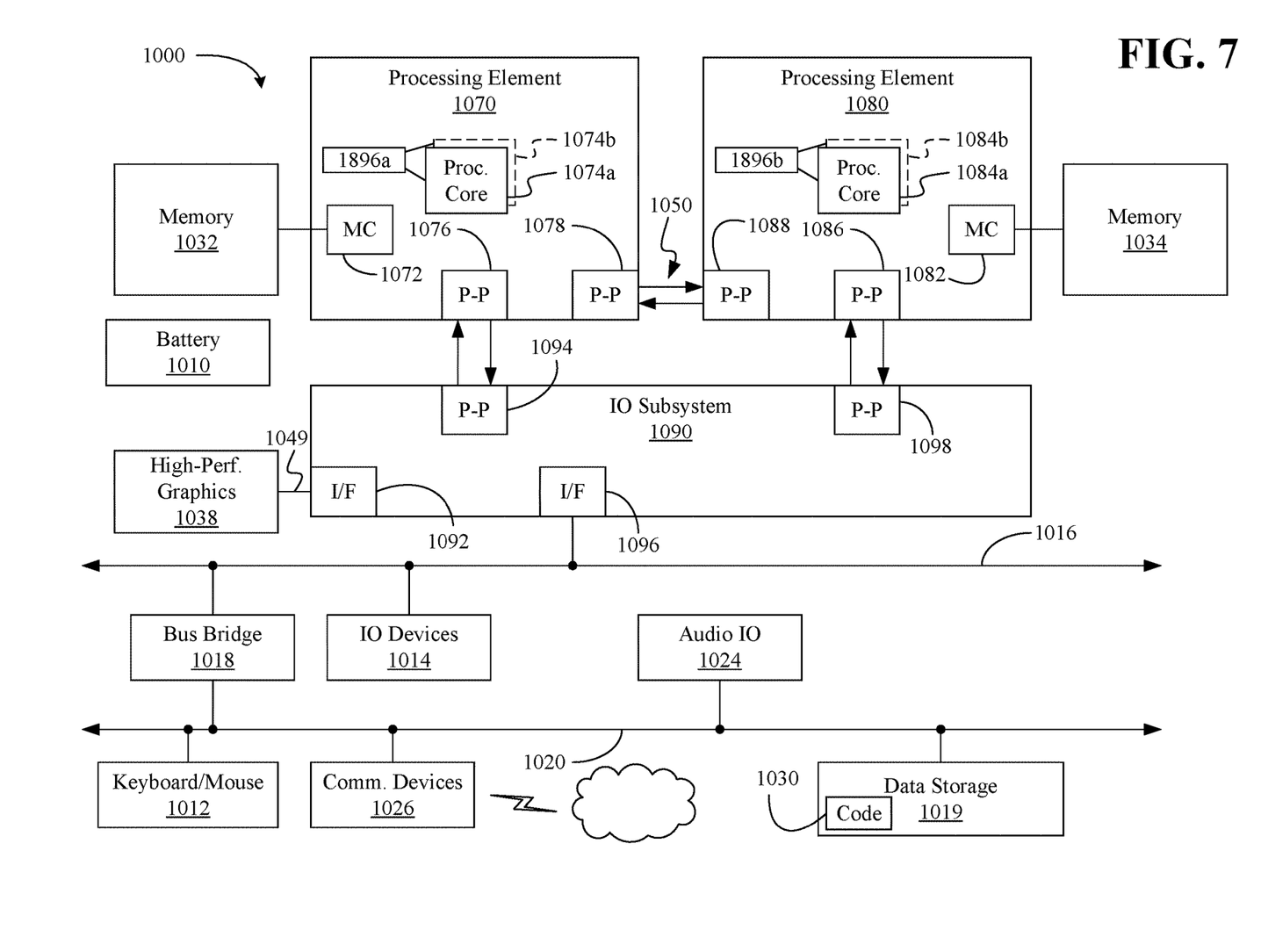
FIG. 7 is a block diagram of an example of a multi-processor based computing system according to an embodiment.

Referring now to FIG. 7, shown is a block diagram of a computing system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 6.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 7, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the method 50 (FIG. 3), already discussed. Further, an audio I/O 1024 may be coupled to second bus 1020 and a battery 1010 may supply power to the computing system 1000.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

Additional Notes and Examples

Example 1 includes a performance-enhanced computing system comprising a socket, a processor coupled to the socket, and a memory coupled to the processor, the memory including a set of executable program instructions, which when executed by the processor, cause the processor to identify a non-uniform memory access (NUMA) node, define a first virtual proximity domain within the NUMA node, and define a second virtual proximity domain within the NUMA node, wherein the first virtual proximity domain and the second virtual proximity domain are defined via one or more operating system (OS) interface tables.

Example 2 includes the computing system of Example 1, wherein the one or more OS interface tables are selected from a group consisting of a static resource affinity table or a system locality information table.

Example 3 includes the computing system of Example 1, wherein the NUMA node is to be dedicated to the socket.

Example 4 includes the computing system of Example 3, wherein the socket is to have an initial interleave configuration, and wherein to define the first virtual proximity domain and the second virtual proximity domain, the instructions, when executed, cause the processor to maintain the initial interleave configuration.

Example 5 includes the computing system of Example 3, wherein the socket is to have an initial cache grouping, and wherein to define the first virtual proximity domain and the second virtual proximity domain, the instructions, when executed, cause the processor to maintain the initial cache grouping.

Example 6 includes the computing system of any one of Examples 1 to 5 wherein the instructions, when executed, further cause the processor to create a first group of processors, associate the first group of processors with the first virtual proximity domain, create a second group of processors, and associate the second group of processors with the second virtual proximity domain.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrate to identify a non-uniform memory access (NUMA) node, define a first virtual proximity domain within the NUMA node, and define a second virtual proximity domain within the NUMA node, wherein the first virtual proximity domain and the second virtual proximity domain are defined via one or more operating system (OS) interface tables.

Example 8 includes the apparatus of Example 7, wherein the one or more OS interface tables are selected from a group consisting of a static resource affinity table or a system locality information table.

Example 9 includes the apparatus of Example 7, wherein the NUMA node is to be dedicated to a physical socket.

Example 10 includes the apparatus of Example 9, wherein the physical socket is to have an initial interleave configuration, and wherein to define the first virtual proximity domain and the second virtual proximity domain, logic coupled to the one or more substrates is to maintain the initial interleave configuration.

Example 11 includes the apparatus of Example 9, wherein the physical socket is to have an initial cache grouping, and wherein to define the first virtual proximity domain and the second virtual proximity domain, the logic coupled to the one or more substrates is to maintain the initial cache grouping.

Example 12 includes the apparatus of any one of Examples 7 to 11, wherein the logic coupled to the one or more substrates is to create a first group of processors, associate the first group of processors with the first virtual proximity domain, create a second group of processors, and associate the second group of processors with the second virtual proximity domain.

Example 13 includes the apparatus of any one of Examples 7 to 11, wherein the logic coupled to the one or more substrates includes transistor channel regions that are positioned within the one or more substrates.

Example 14 includes at least one computer readable storage medium comprising a set of executable program instructions, which when executed by a computing system, cause the computing system to identify a non-uniform memory access (NUMA) node, define a first virtual proximity domain within the NUMA node, and define a second virtual proximity domain within the NUMA node, wherein the first virtual proximity domain and the second virtual proximity domain are defined via one or more operating system (OS) interface tables.

Example 15 includes the at least one computer readable storage medium of Example 14, wherein the one or more OS interface tables are selected from a group consisting of a static resource affinity table or a system locality information table.

Example 16 includes the at least one computer readable storage medium of Example 14, wherein the NUMA node is to be dedicated to a physical socket.

Example 17 includes the at least one computer readable storage medium of Example 16, wherein the physical socket is to have an initial interleave configuration, and wherein to define the first virtual proximity domain and the second virtual proximity domain, the instructions, when executed, cause the computing system to maintain the initial interleave configuration.

Example 18 includes the at least one computer readable storage medium of Example 16, wherein the physical socket is to have an initial cache grouping, and wherein to define the first virtual proximity domain and the second virtual proximity domain, the instructions, when executed, cause the computing system to maintain the initial cache grouping.

Example 19 includes the at least one computer readable storage medium of Example 14, wherein the instructions, when executed, further cause the computing system to identify a second NUMA node, wherein the second NUMA node is dedicated to the physical socket, and define two or more virtual proximity domains within the second NUMA node, wherein the two or more virtual proximity domains are defined via the one or more OS interface tables.

Example 20 includes the at least one computer readable storage medium of any one of Examples 14 to 19, wherein the instructions, when executed, further cause the computing system to create a first group of processors, associate the first group of processors with the first virtual proximity domain, create a second group of processors, and associate the second group of processors with the second virtual proximity domain.

Example 21 includes the at least one computer readable storage medium of any one of Examples 14 to 20, wherein the instructions, when executed, further cause the computing system to define more than two virtual proximity domains within the NUMA node via the one or more OS interface tables.

Example 22 includes a method of operating a performance-enhanced computing system, the method comprising identifying a non-uniform memory access (NUMA) node, defining a first virtual proximity domain within the NUMA node, and defining a second virtual proximity domain within the NUMA node, wherein the first virtual proximity domain and the second virtual proximity domain are defined via one or more operating system (OS) interface tables.

Example 23 includes the method of Example 22, wherein the one or more OS interface tables are selected from a group consisting of a static resource affinity table or a system locality information table.

Example 24 includes the method of Example 22, wherein the NUMA node is dedicated to a physical socket, wherein the physical socket has an initial interleave configuration, wherein defining the first virtual proximity domain and the second virtual proximity domain includes maintaining the initial interleave configuration, wherein the physical socket has an initial cache grouping, and wherein defining the first virtual proximity domain and the second virtual proximity domain includes maintaining the initial cache grouping.

Example 25 includes the method of any one of Examples 22 to 24, further including creating a first group of processors, associating the first group of processors with the first virtual proximity domain, creating a second group of processors, and associating the second group of processors with the second virtual proximity domain.

Example 26 includes means for performing the method of any one of examples 22 to 25.

The technology described herein therefore provides a novel usage of system firmware ACPI tables to describe memory in specific physical NUMA implementations. ACPI tables, such as SLIT and SRAT, may be leveraged for platform and CPU features. For example, proximity domains may be used in SLIT and SRAT tables to simulate multiple virtual NUMA nodes within a single physical NUMA node on multiprocessor systems.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a socket;
a processor coupled to the socket; and
a memory coupled to the processor, the memory including a set of executable program instructions, which when executed by the processor, cause the processor to:
identify a non-uniform memory access (NUMA) node,
define a first virtual proximity domain within the NUMA node, and
define a second virtual proximity domain within the NUMA node, wherein the first virtual proximity domain and the second virtual proximity domain are defined via one or more operating system (OS) interface tables,
wherein the socket is to have one or more of:
(a) an initial interleave configuration, wherein to define the first virtual proximity domain and the second virtual proximity domain, the instructions, when executed, cause the processor to maintain the initial interleave configuration, or
(b) an initial cache grouping, wherein to define the first virtual proximity domain and the second virtual proximity domain, the instructions, when executed, cause the processor to maintain the initial cache grouping.

2. The computing system of claim 1, wherein the one or more OS interface tables are selected from a group consisting of a static resource affinity table or a system locality information table.

3. The computing system of claim 1, wherein the NUMA node is to be dedicated to the socket.

4. The computing system of claim 3, wherein the instructions, when executed, further cause the processor to:
identify a second NUMA node, wherein the second NUMA node is dedicated to the physical socket; and
define two or more virtual proximity domains within the second NUMA node, wherein the two or more virtual proximity domains are defined via the one or more OS interface tables.

5. The computing system of claim 1, wherein the instructions, when executed, further cause the processor to:
create a first group of processors;
associate the first group of processors with the first virtual proximity domain;
create a second group of processors; and
associate the second group of processors with the second virtual proximity domain.

6. The computing system of claim 1, wherein the instructions, when executed, further cause the processor to define more than two virtual proximity domains within the NUMA node via the one or more OS interface tables.

7. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrate to:
identify a non-uniform memory access (NUMA) node;
define a first virtual proximity domain within the NUMA node; and
define a second virtual proximity domain within the NUMA node, wherein the first virtual proximity domain and the second virtual proximity domain are defined via one or more operating system (OS) interface tables;
wherein the NUMA node is to be dedicated to a physical socket, wherein the physical socket is to have one or more of:
(a) an initial interleave configuration, wherein to define the first virtual proximity domain and the second virtual proximity domain, the logic coupled to the one or more substrates is to maintain the initial interleave configuration, or
(b) an initial cache grouping, wherein to define the first virtual proximity domain and the second virtual proximity domain, the logic coupled to the one or more substrates is to maintain the initial cache grouping.

8. The apparatus of claim 7, wherein the one or more OS interface tables are selected from a group consisting of a static resource affinity table or a system locality information table.

9. The apparatus of claim 7, wherein the logic coupled to the one or more substrates is to:
create a first group of processors;
associate the first group of processors with the first virtual proximity domain;
create a second group of processors; and
associate the second group of processors with the second virtual proximity domain.

10. The apparatus of claim 7, wherein the logic coupled to the one or more substrates includes transistor channel regions that are positioned within the one or more substrates.

11. The apparatus of claim 7, wherein the logic coupled to the one or more substrates is to:
identify a second NUMA node, wherein the second NUMA node is dedicated to the physical socket; and
define two or more virtual proximity domains within the second NUMA node, wherein the two or more virtual proximity domains are defined via the one or more OS interface tables.

12. The apparatus of claim 7, wherein the logic coupled to the one or more substrates is to define more than two virtual proximity domains within the NUMA node via the one or more OS interface tables.

13. At least one non-transitory computer readable storage medium comprising a set of executable program instructions, which when executed by a computing system, cause the computing system to:
identify a non-uniform memory access (NUMA) node;
define a first virtual proximity domain within the NUMA node; and
define a second virtual proximity domain within the NUMA node, wherein the first virtual proximity domain and the second virtual proximity domain are defined via one or more operating system (OS) interface tables;
wherein the NUMA node is to be dedicated to a physical socket, wherein the physical socket is to have one or more of:
(a) an initial interleave configuration, wherein to define the first virtual proximity domain and the second virtual proximity domain, the instructions, when executed, cause the computing system to maintain the initial interleave configuration, or (b) an initial cache grouping, wherein to define the first virtual proximity domain and the second virtual proximity domain, the instructions, when executed, cause the computing system to maintain the initial cache grouping.

14. The at least one non-transitory computer readable storage medium of claim 13, wherein the one or more OS interface tables are selected from a group consisting of a static resource affinity table or a system locality information table.

15. The at least one non-transitory computer readable storage medium of claim 13, wherein the instructions, when executed, further cause the computing system to:
  identify a second NUMA node, wherein the second NUMA node is dedicated to the physical socket; and
  define two or more virtual proximity domains within the second NUMA node, wherein the two or more virtual proximity domains are defined via the one or more OS interface tables.

16. The at least one non-transitory computer readable storage medium of claim 13, wherein the instructions, when executed, further cause the computing system to:
  create a first group of processors;
  associate the first group of processors with the first virtual proximity domain;
  create a second group of processors; and
  associate the second group of processors with the second virtual proximity domain.

17. The at least one non-transitory computer readable storage medium of claim 13, wherein the instructions, when executed, further cause the computing system to define more than two virtual proximity domains within the NUMA node via the one or more OS interface tables.

18. A method comprising:
  identifying a non-uniform memory access (NUMA) node;
  defining a first virtual proximity domain within the NUMA node; and
  defining a second virtual proximity domain within the NUMA node, wherein the first virtual proximity domain and the second virtual proximity domain are defined via one or more operating system (OS) interface tables,
  wherein the NUMA node is dedicated to a physical socket, wherein the physical socket has an initial interleave configuration, wherein defining the first virtual proximity domain and the second virtual proximity domain includes maintaining the initial interleave configuration, wherein the physical socket has an initial cache grouping, and wherein defining the first virtual proximity domain and the second virtual proximity domain includes maintaining the initial cache grouping.

19. The method of claim 18, wherein the one or more OS interface tables are selected from a group consisting of a static resource affinity table or a system locality information table.

20. The method of claim 18, further including:
  creating a first group of processors;
  associating the first group of processors with the first virtual proximity domain;
  creating a second group of processors; and
  associating the second group of processors with the second virtual proximity domain.

21. The method of claim 18, further including:
  identifying a second NUMA node, wherein the second NUMA node is dedicated to the physical socket; and
  defining two or more virtual proximity domains within the second NUMA node, wherein the two or more virtual proximity domains are defined via the one or more OS interface tables.

22. The method of claim 18, further including defining more than two virtual proximity domains within the NUMA node via the one or more OS interface tables.

* * * * *